April 2, 1957     O. F. SWANSON     2,787,414
VOTING MACHINE WITH TALLY PRINTING MECHANISM Filed Nov. 19, 1954     8 Sheets-Sheet 1

INVENTOR.
OSCAR F. SWANSON
BY
Bean, Brooks, Buckley & Bean,
ATTORNEYS.

April 2, 1957     O. F. SWANSON     2,787,414
VOTING MACHINE WITH TALLY PRINTING MECHANISM
Filed Nov. 19, 1954     8 Sheets-Sheet 2
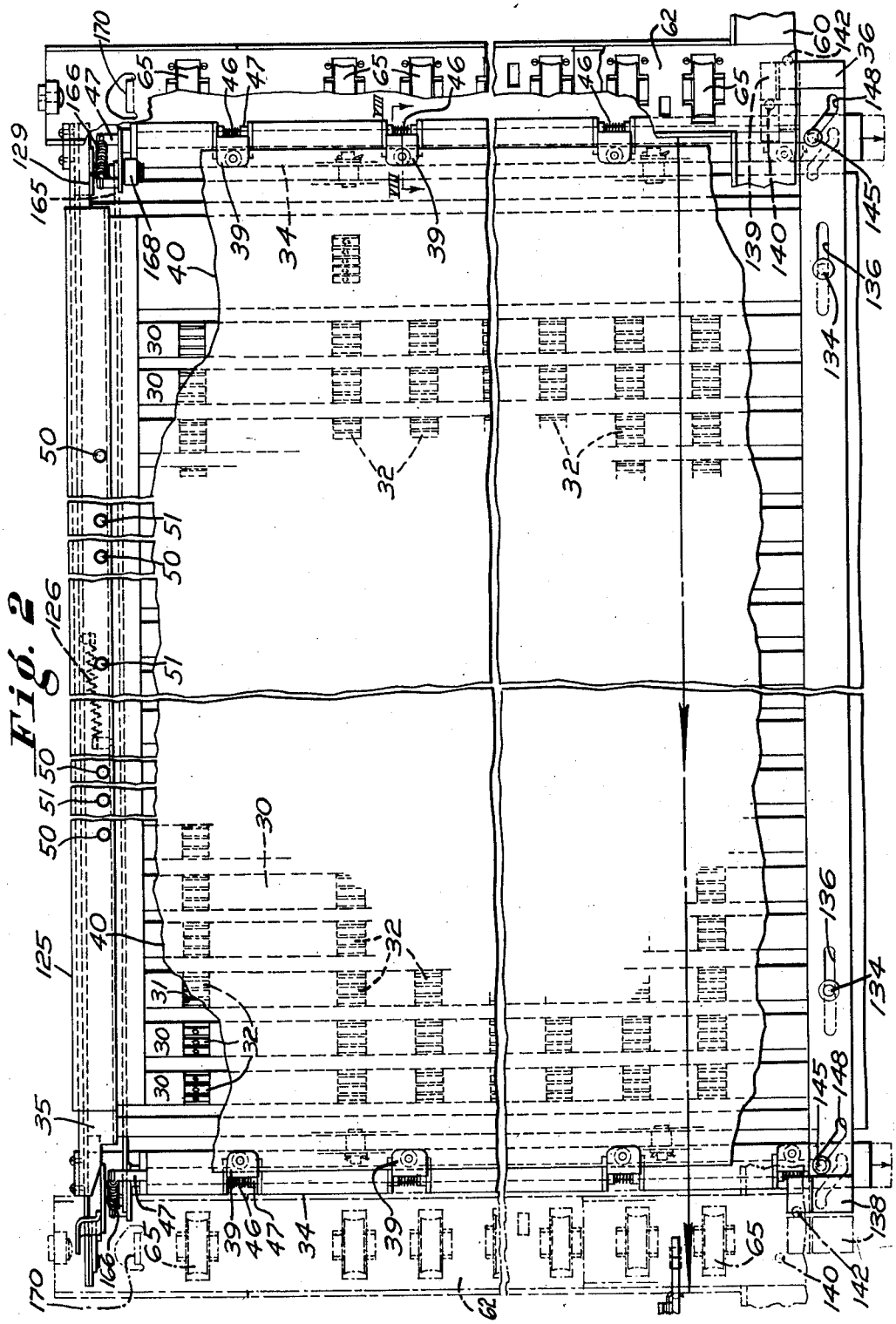

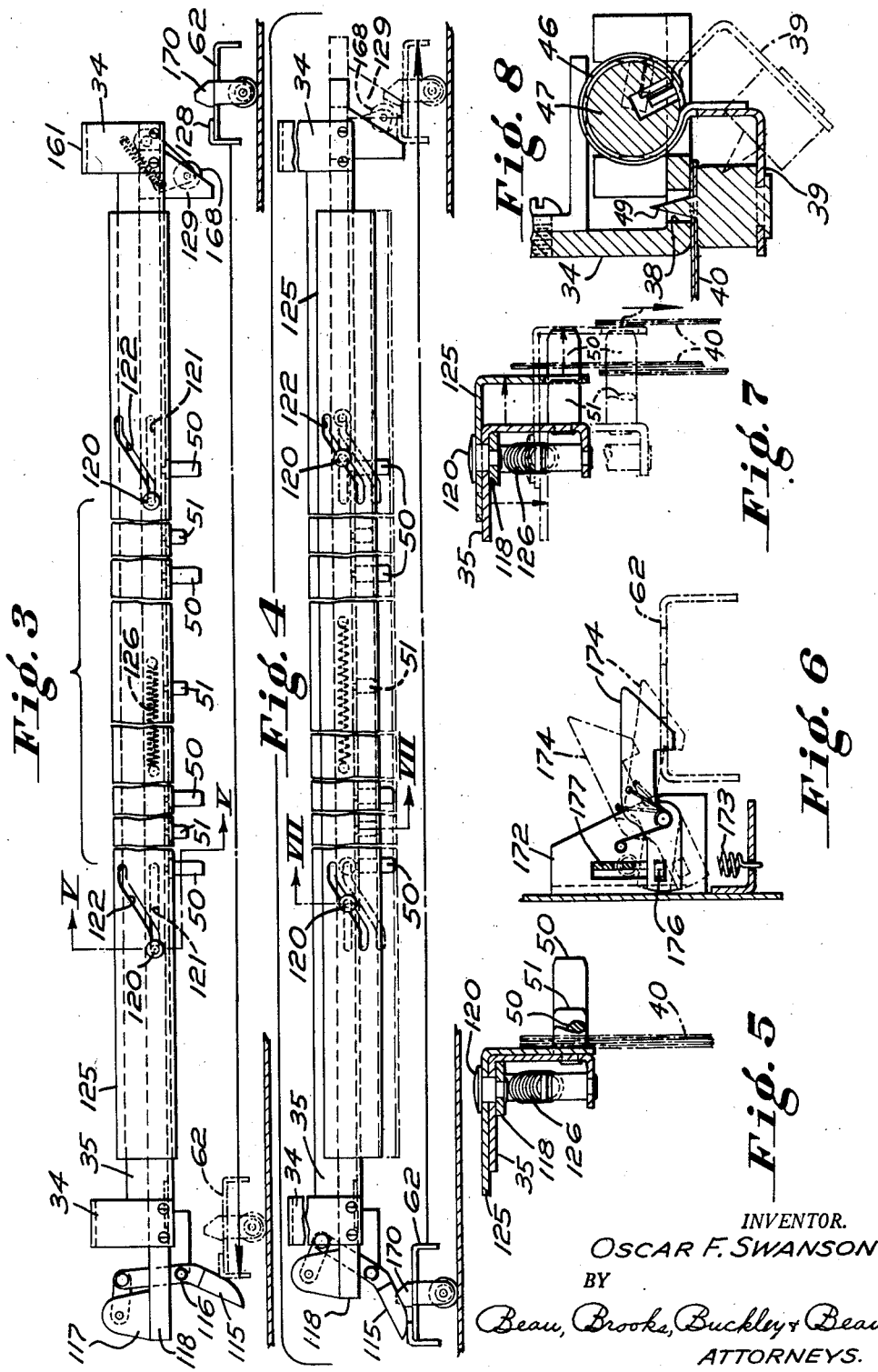

April 2, 1957  O. F. SWANSON  2,787,414
VOTING MACHINE WITH TALLY PRINTING MECHANISM
Filed Nov. 19, 1954  8 Sheets-Sheet 4
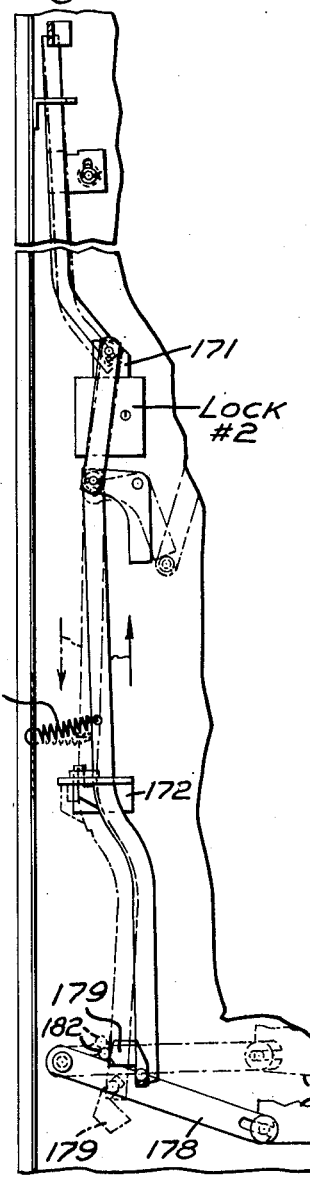
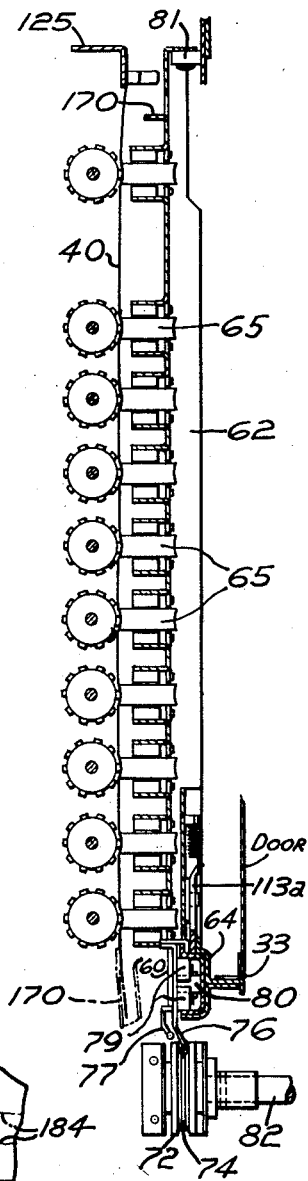
INVENTOR.
OSCAR F. SWANSON
BY
Beau, Brooks, Buckley & Beau,
ATTORNEYS.

April 2, 1957  O. F. SWANSON  2,787,414
VOTING MACHINE WITH TALLY PRINTING MECHANISM
Filed Nov. 19, 1954  8 Sheets-Sheet 5
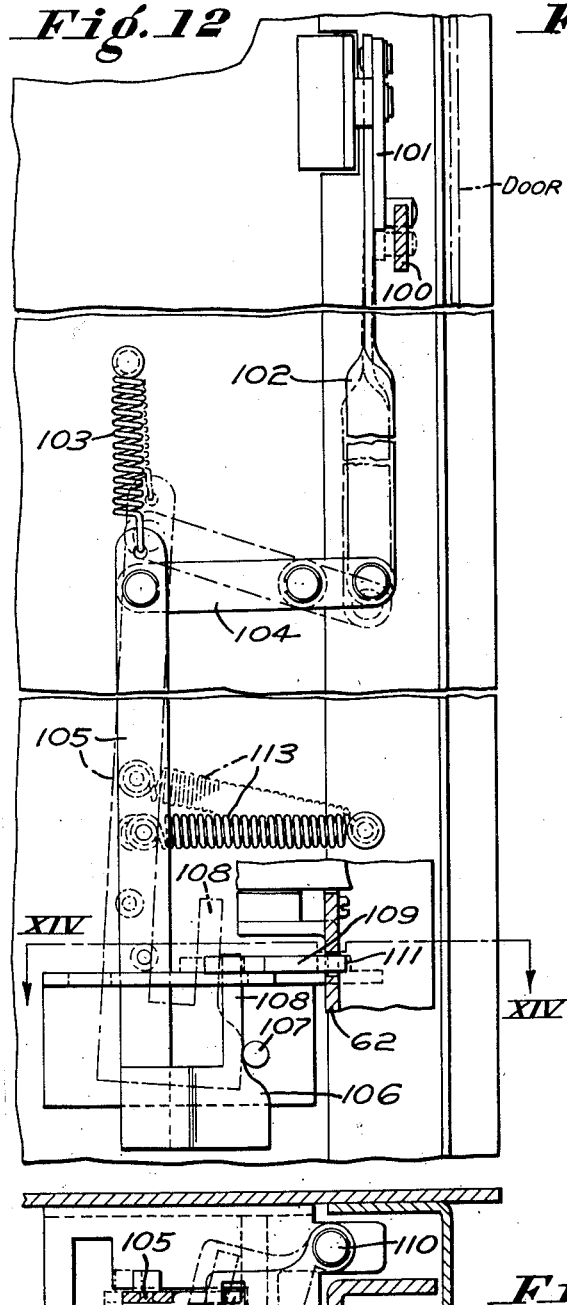
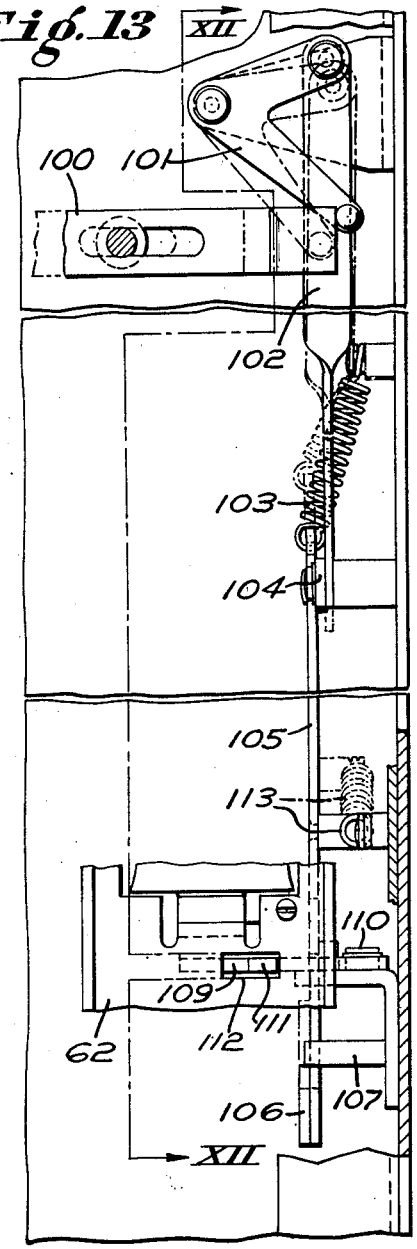
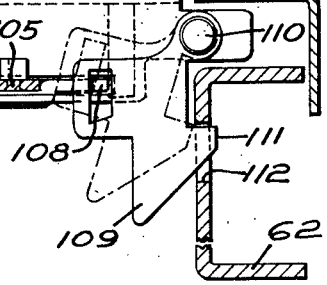
INVENTOR.
OSCAR F. SWANSON
BY
Bean, Brooks, Buckley & Bean,
ATTORNEYS.

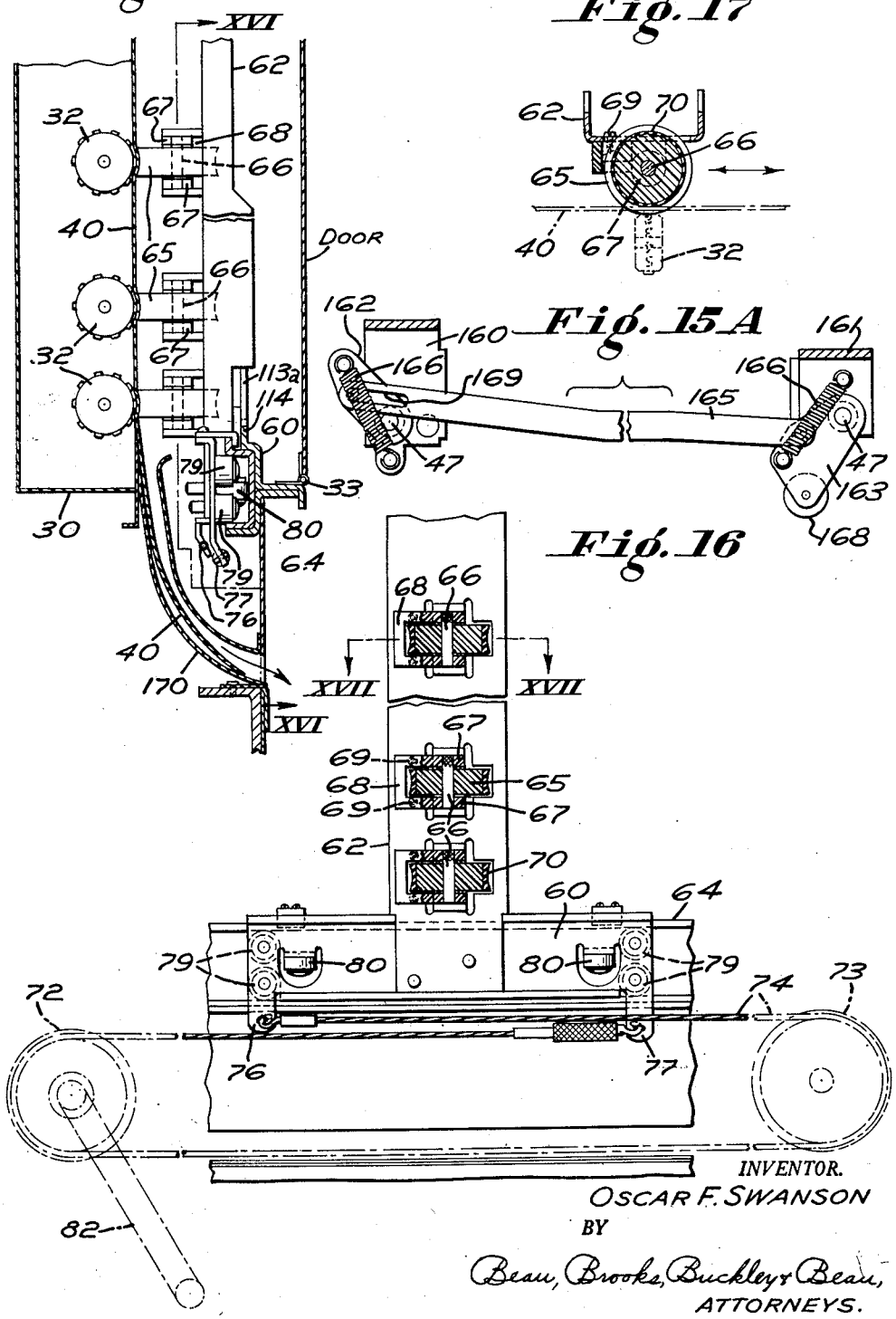

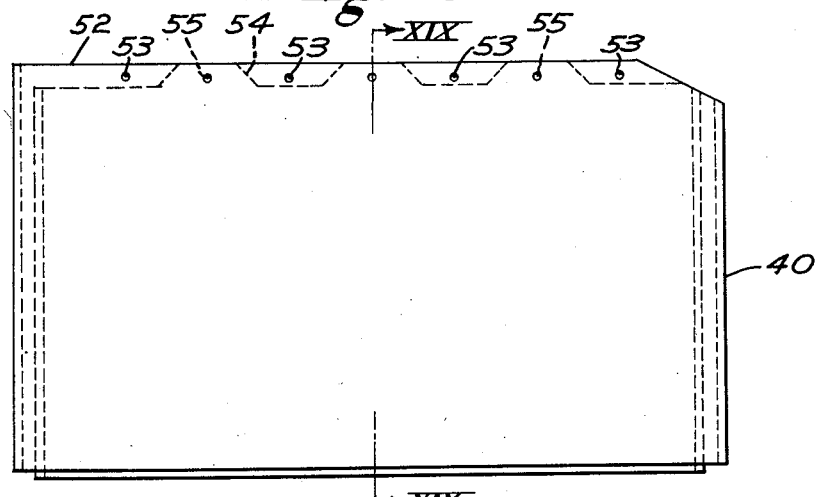
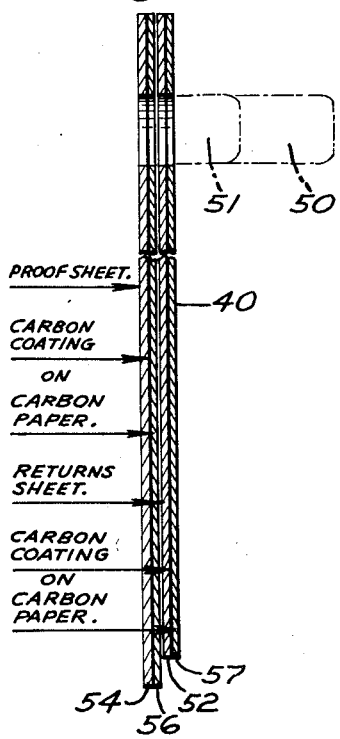
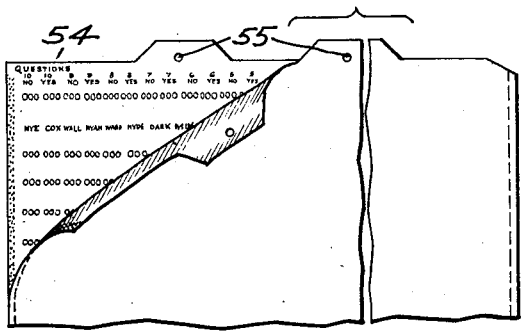
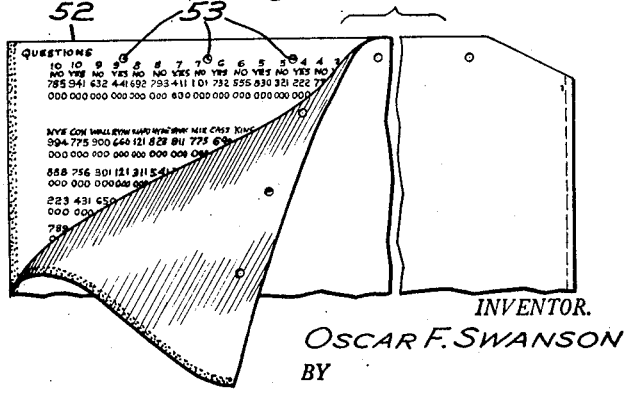

April 2, 1957     O. F. SWANSON     2,787,414
VOTING MACHINE WITH TALLY PRINTING MECHANISM
Filed Nov. 19, 1954     8 Sheets-Sheet 8
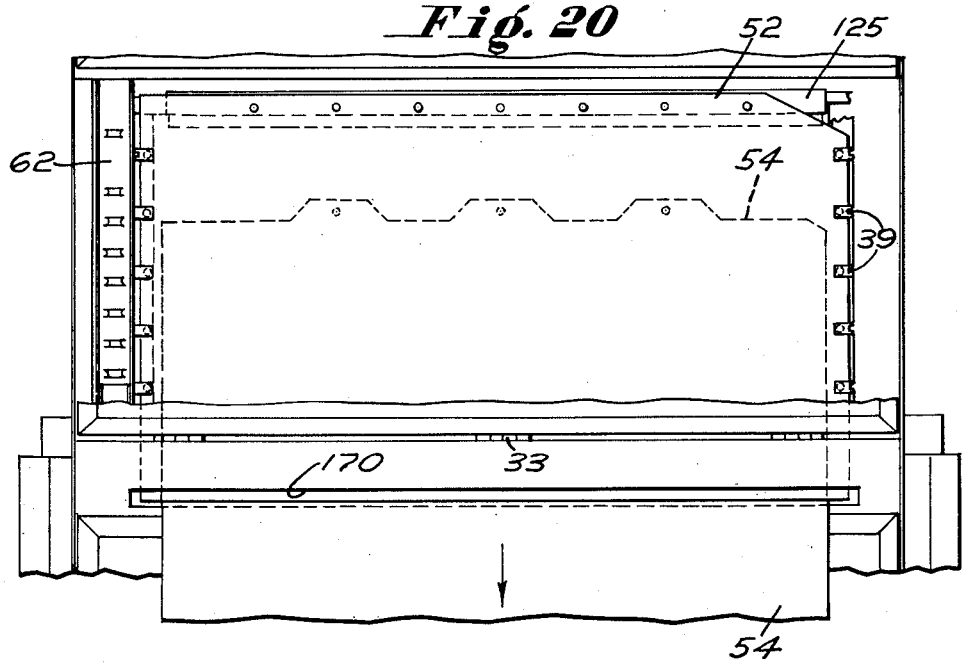
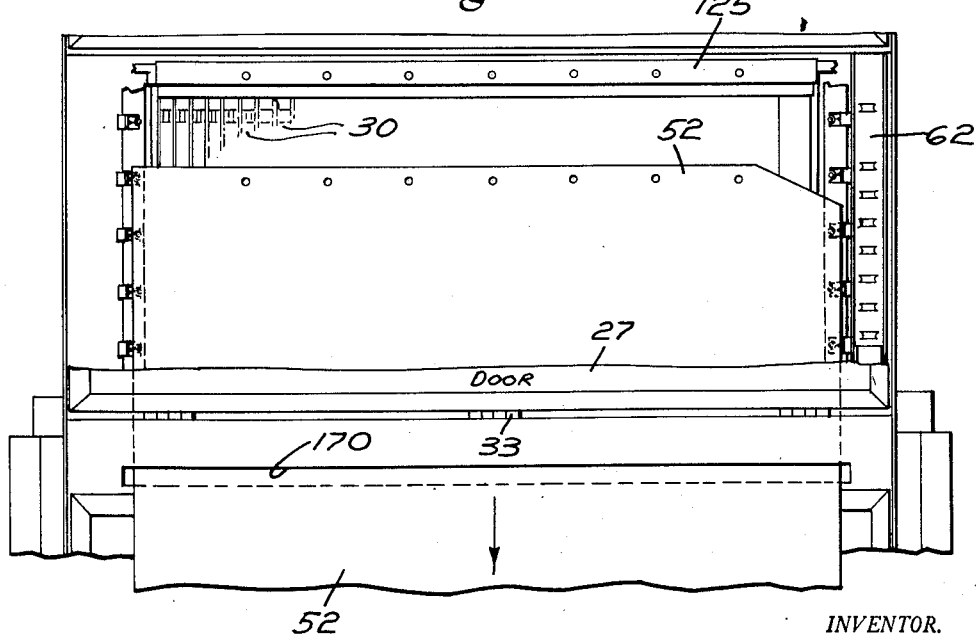
INVENTOR.
OSCAR F. SWANSON
BY
Beau, Brooks, Buckley & Beau,
ATTORNEYS.

United States Patent Office 2,787,414
Patented Apr. 2, 1957

2,787,414

VOTING MACHINE WITH TALLY PRINTING MECHANISM

Oscar F. Swanson, Jamestown, N. Y., assignor to Automatic Voting Machine Corporation, Jamestown, N. Y.

Application November 19, 1954, Serial No. 470,034

14 Claims. (Cl. 235—50)

This invention relates to automatic voting machines, and more particularly to improvements in such machines in connection with voting return sheet printing means thereof.

A primary object of the invention is to provide improved means in voting machines for furnishing printed return sheets therefrom.

Another object of the invention is to provide in a machine as aforesaid improved return sheet handling and printing means.

Still another object of the invention is to provide improvements as aforesaid in combination with improved automatic interlock means preventing tampering with the machine control mechanism and/or the vote recording mechanism and/or the printed return sheets.

Other objects and advantages of the invention will appear in the specification hereinafter.

In the drawing:

Fig. 2 is an enlarged view of a portion of the mechanism shown in Fig. 1;

Fig. 3 is a top view of the proof and return sheet holding mechanism of Fig. 2; the holding mechanism being shown in a position corresponding to the position thereof shown in Fig. 1;

Fig. 4 is a view similar to Fig. 3 but indicating the mechanism in various proof and return sheet dispensing positions;

Fig. 5 is a fragmentary enlarged sectional view taken along line V—V of Fig. 3;

Fig. 6 is a fragmentary enlarged sectional view taken along line VI—VI of Fig. 1;

Fig. 7 is a fragmentary enlarged sectional view taken along line VII—VII of Fig. 4;

Fig. 8 is a fragmentary enlarged sectional view taken along line VIII—VIII of Fig. 2;

Fig. 9 is a semi-schematic vertical sectional view through a portion of the return sheet holding and printing mechanism of the machine;

Fig. 10 is a fragmentary enlarged section taken along line X—X of Fig. 1;

Fig. 11 is a view similar to Fig. 10 but showing the lock mechanism thereof in various adjusted positions;

Fig. 12 is a fragmentary section taken along line XII—XII of Fig. 13;

Fig. 13 is a fragmentary elevational view of a locking mechanism of the invention;

Fig. 14 is a fragmentary section taken along line XIV—XIV of Fig. 12;

Fig. 15 is a fragmentary section on an enlarged scale taken along line XV—XV of Fig. 1;

Fig. 15A is a fragmentary section, on an enlarged scale, taken along line XVA—XVA of Fig. 1;

Fig. 16 is a fragmentary section taken along line XVI—XVI of Fig. 15;

Fig. 17 is a fragmentary section taken along line XVII—XVII of Fig. 16;

Fig. 18 is a rear elevational view of a proof and record sheet pack for use in connection with the printing mechanism of the invention;

Fig. 19 is a section, on an enlarged scale, taken along line XIX—XIX of Fig. 18;

Fig. 20 is a fragmentary rear elevational view of the machine, showing the proof sheet in dispensing position and the record sheet position;

Fig. 21 is a view similar to Fig. 20 but showing the return or record sheet in dispensing position;

Fig. 22 is a fragmentary elevational view of the proof sheet pack; and

Fig. 23 is a view similar to Fig. 22 but of the return sheet pack.

Figure 1:
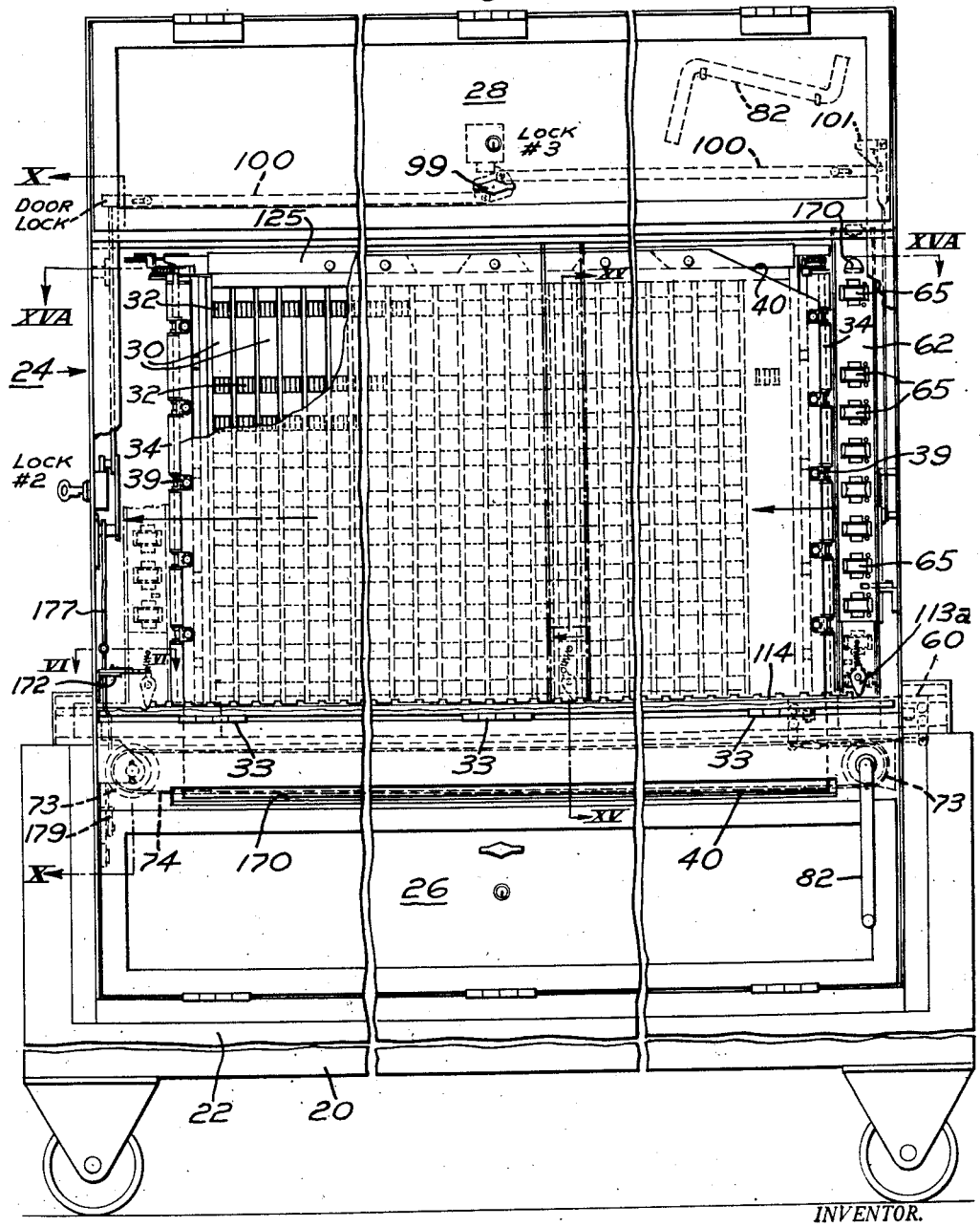
Fig. 1 is a rear elevational view of a standard type voting machine embodying a control and printing arrangement of the present invention; the machine as illustrated having a rear cover panel portion thereof removed.

The invention contemplates broadly an improved means for taking printed return sheet records from the counterwheels of a standard type automatic voting machine, both prior to and subsequent to a vote taking period. For this purpose, the standard voting machine referred to is modified as will be described in detail hereinafter so as to accommodate proof and return sheet carbon packs in printing position behind the counterwheel stacks of the voting machine, in combination with improved means for first taking a record of the "zero" readings of the counterwheels on the proof sheet and on the return sheet; and then subsequent to the voting period taking a printed record of the total votes cast for each candidate directly below his name on the return sheet. However, readings of the counters may also be taken directly without reference to the printed return sheet, as in conventional voting machines. Furthermore, the invention provides, in combination with the aforesaid printing arrangements, novel means for locking and interlocking the various operative components and control mechanisms of the voting machine and the printing mechanism thereof, so as to prevent tampering with the machine mechanisms and to otherwise forestall any attempts to alter or tamper with the voting results.

Thus, as shown for example in the drawing herewith, the invention may be embodied in conjunction with a standard type voting machine comprising generally a base frame portion 20 carrying a housing 22 upon which is mounted in vertically standing attitude the voting machine frame as indicated generally at 24 (Fig. 1). The lower end of the machine frame 24 is encompassed within the housing 22, and is provided with a hinged cover panel as indicated at 26 to provide (as is customary in the art) the "custodians" compartment. Thus, the panel 26 and door 27 (Fig. 21) are arranged to be normally locked in closed position so that only the machine custodian may obtain access therein for the purpose of checking or resetting the machine counters, such as may be required. Similarly, the upper end portion of the machine frame 24 is also arranged to be normally closed by means of a lockable hinged panel 28, thereby providing therebehind the so-called "paper roll compartment" containing the storage paper roll conventionally supplied in conjunction with such machines for the purpose of enabling additional candidates' names to be written in at the time of balloting.

The central body portion of the machine frame 24, when uncovered at the rear, exposes to view the bank of "stacks" or columns of counterwheels of the voting machine, so that the election officers may read the results of a voting period. Thus, as shown in Figs. 1 and 2, the counter stacks or columns will appear when viewed from the rear of the machine as indicated at 30; each stack being provided with a series of vertically spaced windows 31 through which the peripheral portions of the counterwheels 32 mounted therein extend outwardly beyond the stack casings. The machine frame portion encompassing the bank of counter columns 30 is arranged to be normally covered by means of a door plate hinged to the machine frame, as by means of hinge devices as indicated at 33 (Figs. 1 and 9). It is to be understood that the machine parts referred to so far are presently standard, and that the present invention relates only to mechanism for taking printed records of the counterwheel readings; and is not concerned with the mechanism whereby the voters register their votes into the counter mechanisms.

In the machine of the present inventions a "return sheet" holding frame is arranged perimetrically of the counter columns, and as shown in the accompanying drawing comprises a side post 34 at each end of the bank of counter columns and a top plate 35 and a bottom plate 36, whereby the posts 34—34 and the plates 35—36 comprise therebetween a rectangular frame encompassing the perimeter of the bank of counter columns as viewed from the rear of the machine. At vertically spaced intervals the rear faces of the end posts 34—34 are perforated to provide a series of apertures 38 (Fig. 8) against which corresponding clamp arms 39 are adapted to be swung for the purpose of gripping therebetween, as shown in Fig. 8, a return sheet pack as indicated at 40 comprising alternately disposed carbon paper and printing papers (Figs. 1, 2, 5, 7, 8, 9). As shown in Fig. 8, the clamp arms 39 are keyed to vertical pintles 47 carried by the end posts 34 and are spring-biased toward paper holding positions by means of coil springs 46 (Figs. 2 and 8) arranged coaxially with the pintle portions 47 of the end post members. As shown in Fig. 8, the clamp arms 39 are preferably provided with spear-pointed pads 49 at their sheet pack engaging end portions, whereby the spear devices of the clamp arms are adapted to puncture the edges of the return sheet pack and to penetrate therethrough into the corresponding apertures 38 carried by the frame structure, with a view to firmly locking the return sheet pack to the end post members 34—34.

The top plate 35 is provided at horizontally spaced intervals therealong with rearwardly projecting stub pins 50—51. As shown in Figs. 1, 18, 19, 22, 23, the return sheet 52 is shaped and perforated as indicated at 53 along its upper edge so as to slip-fit upon the frame pins 50, while the proof sheet 54 is shaped and perforated as indicated at 55 so as to hang upon the frame pins 51. The proof sheet 54 is accompanied by a carbon paper 56, and the return sheet 52 is accompanied by a carbon sheet 57. Thus, upon opening of the hinged panel normally covering the rear of the counter column compartment, the machine custodian may hang the pack 40 of alternate proof and carbon and return and carbon sheets upon the pins 50—51, and then close the clamp arms 39 inwardly upon the opposite side or end edges of the pack, thus firmly locking the pack in position behind the counter columns and in contact with the exposed peripheral portions of the counterwheels. Then, subsequent to taking printed recordings of the readings of the counterwheels before and after the voting period (as will be explained hereinafter) the proof and record sheets may be separately released from the machine by selective displacements of the proof and record sheets from the pins 50—51 and opening of the clamp devices 39. Means for so releasing the proof and return sheets will also be referred to and described in detail hereinafter.

In order to print the readings of the counterwheels upon the proof and record sheets there is provided a traveling platen which is generally in the form of an upright bracket comprising a base plate portion 60 and a vertical post portion 62 rigidly attached thereto. The base plate portion 60 is mounted for horizontal sliding engagement upon a fixed rail 64 (Figs. 9, 15, 16) extending transversely of the rear of the machine and comprising an integral portion of the rigid frame structure thereof; and the platen post portion 62 mounts a series of platen rollers 65 upon vertical axle means in such manner that the rollers 65 are in horizontal registry with the exposed peripheral portions of the counterwheels as indicated at 32 (Fig. 2). The platen post 62 is disposed rearwardly of the exposed portions of the counter columns, and the rollers 65 are so dimensioned and arranged thereon that when the paper pack referred to hereinabove is hung upon the pins 50—51 and the platen device is moved from side-to-side of the machine as viewed in Figs. 1, 2, the roller devices 65 will thereupon press the paper pack firmly against the exposed raised numerals of the counterwheels, thereby causing the carbon papers to print the counterwheel readings upon the return sheets of the paper pack (Fig. 15).

It is a particular feature of the invention that the platen rollers 65 are mounted relative to the platen post 62 in such manner that the rollers are carried by the post so as to firmly squeeze the record paper packs against the counterwheels, while at the same time permitting the platen wheels 65 to individually "float" and adjust themselves three-dimensionally both as to position and attitude relative to the various counterwheel surfaces as the latter are encountered during printing movements of the platen bar. Thus, for example, as shown in Figs. 15—17 of the drawing herewith, the platen wheels 65 are each mounted upon the platen post 62 by means of a vertical pin axle 66 which is carried at its opposite ends in eye portions 67—67 of a somewhat flexible fork device 68 which is fixed to the platen post 62, as by machine screws 69. The fork devices 68 may be conveniently molded, for example, from "nylon"-type plastic, or any other suitable material having similar elasticity and strength characteristics so as to be able to successfully withstand the pressure loads thereon while at the same time permitting the wheels 65 to deflect as necessary and to deviate away from their theoretical or normal alignment attitudes. Thus, the wheels are enabled to precisely complement the actual positions and attitudes of the exposed portions of the various counterwheels 32 as the latter are encountered by the platen rollers as the platen post is moved from side-to-side as viewed in Figs. 1 and 2.

The platen rollers 65 are also provided with concave-sectioned rubber tires as indicated at 70 (Figs 16—17); the concavity forms of the tires 70 being provided so as to complement the peripheral curvatures of the counterwheels 32 (Fig. 15). Thus, as shown in Fig. 15, the platen wheels 65 are adapted to press the paper pack 40 into ideally conforming pressure bearing relation against the exposed peripheral portions of the counterwheels 32; thereby insuring perfect printing results incidental to passage of the platen device from one side to another of the machine. Movements of the platen post from one side to another of the machine are conveniently accomplished by means of an endless cable-pulley mechanism as shown in Figs. 1, 9, 15, 16.

Thus, the platen actuating mechanism may comprise a pair of V-sectioned pulleys 72, 73 at opposite ends of the machine having a cable 74 reeved therearound and hooked at its opposite ends to bracket devices 76, 77 (Fig. 16); the ends of the cable 74 being thus arranged in overlapping relation so as to enable full travel of the platen bar from one side of the machine to the other. As shown in Fig. 16, the bracket pieces 76, 77 are conveniently formed integral with the base plate 60 attached to the bottom end of the platen post 62, and the plate 60 is arranged to mount vertical and horizontal guide rollers 79, 80 running in the channel sectioned track piece 64. A roller 81 guides the top end of the platen 62 relative to the machine casing, as shown in Fig. 9. A hand crank 82 is provided for detachable connection to the pulley 73, so that the election officer may thereby manually power the pulley-cable system to cause the platen device to travel from one side to the other of the machine for record printing purposes, as will be explained more fully hereinafter. When the handle 82 is not in use, it may be conveniently stowed within the upper "paper roll" or "write-in" compartment, as shown in broken lines at the upper right-hand corner of Fig. 1.

The invention contemplates particularly a novel coordination and automatic actuation of the various components of the machine in response to manual controls thereof, as will now be explained in more detail. Generally stated, the machine is so constructed and arranged that a typical use of the machine may be said to involve the following operations in sequence. First, the election officer unlocks the lock shown in the upper central portion of Fig. 1 designated "lock No. 3." The lock handle 99 is then rotated in counterclockwise direction as viewed in Fig. 1, thereby pulling the latch bars 100 inwardly and away from door locking positions at their outer ends. As the right hand bar 100 moves toward the left, it thereby also releases a bell crank 101 (Figs. 12—13) which connects with a vertically disposed bar 102 which in turn connects to a rocker link 104 and a pull bar 105. The bar 105 is biased by a tension spring 103 upwardly, and hence bar 102 is biased downwardly and moves down when released by unlocking of bar 100. The bar 105 is formed at its lower end with an enlarged cam plate portion 106 which is arranged to cam against a fixed pin 107 when the bar 105 is lifted as from its solid line to its broken line position as shown in Fig. 12, thereby throwing to the left the lower end of the bar 105.

The bar 105 also includes an upright finger portion 108 which engages in an aperture formed in a locking dog 109 which is pivoted to the machine frame, as indicated at 110. Thus, as the lower end of the bar 105 is pulled to the left as viewed in Fig. 12, the finger portion 108 thereof will simultaneously pivot the dog 109 in clockwise direction (Fig. 14) thereby withdrawing its detent portion 111 (Figs. 12-14) from an aperture 112 in the platen post 62. This releases the post 62 so that it may be actuated by the election officer through means of the crank 82, as explained hereinabove, to cause the platen to move from the right hand end of the machine to the left hand end of the machine as shown in Fig. 1. This operation causes both the inside or "Proof" record sheet and the outside or "return" sheet to be printed against the counterwheels 32, so as to provide thereon a printed record of the "zero" readings of the counterwheels. A spring 113 (Fig. 12) biases the arm 105 to the right. To insure that the election officer cannot reverse the cranking of the platen prior to traversing of the entire bank of counterwheels when traveling in either direction, a spring-centered pawl as indicated at 113a is pivotally mounted on the platen and arranged to engage a toothed rack fixed to the machine frame as indicated at 114 (Figs. 1 and 15).

The latch 109 is automatically "set" in the platen holding position shown in Fig. 14 when the custodian mounts the pack 40 of return sheets in position, preliminary to a voting period. Then, when the election officer subsequently unlocks the machine at lock No. 3 as explained hereinabove, the platen is free and he fits the crank 82 in position as shown in Fig. 16 and moves the platen 62 from the right to the left hand end of the machine. When the platen post 62 reaches its furthermost left-hand position, it cams at its upper end against a lever 115 (Figs. 3—4) which is pivotally mounted as indicated at 116 upon fixed structure of the machine frame. This causes the upper end of the lever 115 to pull toward the right upon a bracket 117 fixed to a control slide 118 which telescopically fits behind the sheet holding frame top plate 35.

The slide bar 118 carries a pair of pins 120—120 which extend upwardly through straight-line slots 121—121 formed in the fixed plate 35 and thence into inclined slots 122—122 formed in the top surface of an angle-sectioned "pusher" 125 which lies upon the top plate 35.

The front face of the pusher 125 is apertured to slide-fit over the pack holding pins 50—51 under the record pack when hung thereon, and thus it will be appreciated that when the slide 118 is displaced to the right as viewed in Figs. 3, 4 (against the action of a return spring 126) the record sheets will be thereby pushed off the pins 50—51. The layer system 115 is arranged so as to displace the slide 118 only enough to "dump" the proof sheet 54 from the short pins 51 when the platen reaches its lefthand position (Fig. 4); while the platen is provided with a ledge 128 which abuts and pulls against a bracket 129 at the right hand end of the slide 118 upon subsequent return of the platen to pull the slide still further to the right so as to "dump" the return sheet 52 subsequent to the voting period.

The sheet pack 40 as stated hereinabove is hung upon the pins 50—51 extending from the top plate 35 and is pinned against the side posts 34—34 by means of the clamps 39. This inverted U-shaped frame structure is in turn vertically supported relative to the machine by means of a pair of pins 145—145 engaging within slots 148—148 in the cam bar 36. The bar 36 is in turn supported by a pair of pins 134—134 which extend from stationary structure of the machine frame through horizontal slots 136—136 formed in plate 36. Thus, the plate 36 is shiftable from right to lift, or from the solid line to the broken line position thereof as indicated in Fig. 2; and the plate 36 is formed at its left hand end portion with an upstanding bracket 138, and at its right hand end portion with an upstanding bracket 139.

The platen post 62 is provided with a pair of pusher pins 140-142; the pin 142 being disposed at such elevation as to abut against the bracket 138 when the post 62 is moved to the left, while the pin 140 is disposed at a higher elevation so as to bear against the bracket 139 while clearing the bracket 138, as the platen post is moved from left to right as explained hereinabove. The parts are so dimensioned and arranged, that as shown in Fig. 2, the plate 36 is in the solid line position thereof when the platen post 62 is at the right hand end portion of the machine. Pins 145—145 extending rigidly from the lower ends of the side frame posts 34—34 slip-fit through vertically sloping slots 148—148 formed in the bottom plate 36.

The slots 148—148 are so shaped and dimensioned that whenever platen post 62 is displaced from the right hand end of the machine to the left hand end thereof, the last one inch of travel of the platen post to the left causes the platen pin 142 to bear against the bracket 138, thereby displacing the bottom plate 36 to the left as to the broken line position thereof shown in Fig. 2. This motion of the bottom plate 36 to the left causes the pins 145—145 to be pulled down to lower elevations, thereby lowering the entire record pack holding frame approximately one half inch compared to its previous elevation at the end of the process of rolling the platen post from the right hand end of the machine to the left hand end of the machine. Thus, it will be appreciated that upon subsequent return of the platen post from the left hand end of the machine to the right hand end thereof, the record pack will be disposed at a lower elevation whereby the voting totals of the counter-wheels will be printed on the return sheet at an elevation approximately one-half inch higher than the "zero readings" which were initially printed on the record sheet during travel of the platen post from the right hand end of the machine to the left hand end thereof. Thus, subsequent inspection of the record sheet will at a glance disclose any faulty "zero readings" which may be readily compensated for by subtracting the "zero readings" from the final readings located just above.

Furthermore, it will be appreciated that, by virtue of the construction of the machine as explained hereinabove, upon return of the platen post 62 to the right hand end of the machine, the last one inch of travel thereof to the right will cause the uppermost platen pin 140 to bear against the bracket 139, thereby forcing the bottom plate 36 back to its original position as shown in solid lines in Fig. 2, incidental to which motion the entire record pack holding frame will be lifted upwardly approximately one half inch and thus back again to its normal elevation, preparatory to repetition of the cycle.

As explained hereinabove, the end posts 34—34 each carry vertically extending rotatable pintles 47 which control the positions of the record pack clamps 39. As shown in Figs. 2, 15A, the upper ends of the pintles 47—47 are pivotally mounted by means of brackets 160—161 extending from fixed structure of the machine frame, and are arranged to be positionally controlled by means of corresponding crank arms 162—163. These crank arms are in turn interconnected by means of a cross bar 165, and are each provided with a "dead center" tension spring 166 operable to bias the clamp pintles 47—47 alternately between clamp-opening and clamp-closing positions. The crank arm 163 is also provided with a cam roller 168 which is arranged to engage a cam portion 170 formed integrally with the platen post 62 as the latter is moved back and forth from opposite ends of the machine as explained hereinabove.

Thus, it will be appreciated that with the roller arrangement as shown in Fig. 15A, upon return of the platen post to the right hand end of the machine subsequent to the taking a voting record, the cam device 170 on the platen post will bear against the cam roller 168 and cause the crank arm 163 to rotate in counterclockwise direction, thereby rotating the right hand pintle 47 so as to open the clamps previously holding the return sheet pack in printing position behind the counterwheels. Simultaneously, the connecting rod 165 operates upon the left hand crank 162 so as to similarly actuate the clamp control pintle 47 at the left hand end portion of the machine. Consequently, upon subsequent operation of the top control slide 118 whereby the return sheet 52 is pushed off the pins 50, as explained hereinabove, the return sheet is thereby completely released and "dumped" from the printing frame and thus permitted to slide by gravity downwardly through a sheet metal chute device as indicated at 170 (Figs. 1, 15, 20, 21). The rod 165 is slotted as indicated at 169 (Fig. 15A) to permit the linkage to "give" in event the platen 62 interferes with the roller 168 when moving from right to left. As explained hereinabove, subsequent to initial movement of the platen post from the right hand end of the machine to the left hand end thereof, the proof sheet 54 is released from the relatively short pins 51; and because the proof sheet is of lesser lateral dimension than the return sheet and is never engaged by the clamps 39, the proof sheet is "dumped" from the printing frame through the chute 170 as soon as the "zero readings" of the counterwheels are taken.

To insure that the election officer manipulates the printing mechanism of the machine in the sequence as outlined hereinabove, a control interlock mechanism is provided at the left hand end portion of the machine as viewed in Fig. 1. This device includes a key controlled lock which is designated in the drawing at Figs. 1, 10, 11 as "lock No. 2." This lock includes a vertically displaceable bolt as indicated at 171 which moves upwardly when the lock mechanism is turned to "open" position, thereby pulling upwardly on a control bar 177 which slidably passes through an apertured bracket 172 fixed to the machine frame (Figs. 6, 10, 11). The bar 177 is biased toward the left as viewed in Figs. 10 and 11 by means of a tension spring 173. The bracket 172 mounts a pivotable latch 174 which is apertured at one end as shown in Fig. 6. However, the latch 174 is spring-biased toward the lowermost broken line position shown in Fig. 6, so as to normally block entrance through the apertured portion of the bracket 172 of an upwardly projecting finger 176 which extends integrally from the bar 177. Thus, the bar 177 is normally maintained against lifting from the position there shown in Fig. 10 as to the broken line position thereof shown in Fig. 11 until such time as the platen post 62 is moved by the election officer to the left hand end portion of the machine as explained hereinabove. At this time the platen post bears against the outer end of the latch 174 (Fig. 6) and aligns the apertured portion of the latch with the apertured portion of the bracket 172 so that the finger 176 may pass upwardly therethrough when the lock No. 2 is lifted. Thus, the election officer is prevented from opening lock No. 2 until he has first printed the "zero readings" on the proof sheet and return sheet. A walking beam 178 is pivoted to the frame as indicated at 180. The lower end of the bar 177 carries a pivot latch 179 which is manually set to engage a boss 182 extending from the beam 178, so that the latch remains "set" as long as the beam remains cocked at the angle thereof shown in Fig. 10. However, the free end of the beam pivotally engages a side arm portion 184 of the standard operating mechanisms which raises automatically as to the broken line position thereof shown in Fig. 11 when the first voter closes the curtain behind him preliminary to casting his vote. When the beam is so raised the latch 179 is released to fall by gravity to the broken line position shown in Fig. 11, thus releasing the lower end of bar 177 to be pulled to the left by the spring 173 whenever the finger 176 is withdrawn from the aperture of the latch 174. The curtain is blocked against opening until at least one vote is cast on the machine.

When the voting period expires the election officer turns lock No. 2 down, closing the machine against further voting (by means of interconnection through crank 186 comprising standard mechanism in the machine). Depression of lock No. 2 moves finger 176 out of latch 174 and bracket 172, thus releasing bar 177 to be pulled to the left by spring 173, thereby moving latch 174 to the wide open broken line position shown in Fig. 6. The platen is thereby released to be returned to the right hand end of the machine for making a printed record of the votes cast as explained hereinabove. The latch 179 remains in down position, and thus it is impossible to turn lock No. 2 again for further voting until such time as the custodian "resets" the machine for another election.

Although only one form of the invention has been shown and described in detail, it will be apparent to those skilled in the art that the invention is not so limited but that various changes may be made therein without departing from the spirit of the invention or the scope of the appended claims.

I claim:

1. In a voting machine having a bank of counter columns arranged in upright side-by-side alignment with the counterwheels thereof arranged in horizontally aligned rows and with peripheral segment portions thereof protruding rearwardly beyond adjacent structure of the voting machine, a voting return printing device comprising, in combination, a frame mounted upon said voting machine marginally of said bank of counter columns and arranged to be vertically shiftable relative thereto, a record sheet pack comprising a record sheet and a carbon sheet in face-to-face relation, means mounting said record sheet pack upon said frame to cover the rear surfaces of said protruding counterwheels, a printing platen comprising a member mounting upon vertical axles a series of concave-faced rollers, said platen being mounted upon said machine so as to be shiftable from end-to-end thereof across the rear faces of said counterwheels, said rollers being dimensioned and arranged upon said platen so as to be carried thereby in horizontally traveling directions and pressed firmly against the protruding segment portions of said counterwheels whereby to press said record sheet pack against the exposed segment portions of said counterwheels thereby impressing upon said record sheet facsimiles of the readings of said counterwheels, cam means carried by said machine and operable automatically upon arrival of said platen at one end of said machine to cam said frame vertically whereby to cause said record sheet pack to be positioned at one elevation during travel of said platen from one end of said machine to another, while being disposed at a different elevation during travel of said platen from said other end of the machine to the first mentioned end thereof, and means connected with said means mounting the record sheet pack upon the frame operable automatically upon arrival of said platen at one end of the machine to release said record sheet to fall by gravity out of the machine.

2. In a voting machine having a bank of counter columns arranged in upright side-by-side alignment with the counterwheels thereof arranged in horizontally aligned rows and with peripheral segment portions thereof protruding rearwardly beyond adjacent structure of the voting machine, a voting return printing device comprising, in combination, a frame mounted upon said voting machine marginally of said bank of counter columns and arranged to be vertically shiftable relative thereto, a pin means carried by said frame while being movable thereon, a record sheet pack comprising a record sheet and a carbon sheet in face-to-face relation suspended by said pin means to hang from said frame to cover the rear surfaces of said protruding counter-wheels, a printing platen, flexible members mounting a series of vertical axles upon said platen, a series of concave-faced rollers carried by said axles, said platen being mounted upon said machine so as to be shiftable from end-to-end thereof across the rear faces of said counterwheels, said rollers being dimensioned and arranged upon said platen so as to be carried thereby in horizontally traveling directions while pressing said sheet pack firmly against the protruding segment portions of said counterwheels whereby to impress upon said record sheet facsimiles of the readings of said counterwheels, cam means carried by said machine and operable automatically upon arrival of said platen at alternate ends of said machine to cam said frame up and down whereby to cause said record sheet pack to be positioned at different elevations during travel of said platen away from opposite ends of said machine, and cam means operable automatically upon arrival of said platen at opposite ends of said machine for actuating said pin means to alternately retract and protrude relative to said frame, and grip means movably mounted upon said frame and operable automatically upon arrival of said platen at one end of the machine for releasing said record sheet to fall by gravity out of the machine.

3. In a printing machine including a bank of counterwheels partially exposed at the rear of said machine, a record sheet holding frame circumscribing said bank of counterwheels, a platen mounted upon said machine to be movable from end-to-end thereof across the back surface thereof, the rear portion of said machine being closed by a hinged panel, a lock device for said panel, said platen bar being normally disposed at a first end portion of said machine clear of said frame enclosing area whereby upon opening of said panel a record sheet pack may be hung upon said frame, means operable by said panel lock whereby upon closing of said panel and turning of said lock said platen bar is released, crank means operatively connected to said platen bar for causing the latter to move from one side of said machine to the other, roller means carried by said platen bar for pressing the record sheet pack against exposed portions of said counterwheels as said platen bars move from side-to-side of said machine by said crank operation, means operable automatically upon arrival of said platen bar at the second end portion of said machine for causing said frame to shift downwardly subsequent to a first printing of "zero readings" of said counterwheels on said record sheet, lock means automatically holding said platen bar at said second end position of said machine until such time as a vote is cast into said machine whereupon said platen bar is released and adapted to be returned to said first end position upon operation of said crank means, and cam means operable automatically upon return of said platen bar to said first end position for releasing said record sheet from said frame whereby said record sheet may fall by gravity out of the machine.

4. In a voting machine having a bank of counter columns arranged in upright side-by-side alignment with the counterwheels thereof arranged in horizontally aligned rows and with peripheral segment portions thereof protruding rearwardly beyond adjacent structure of the voting machine, a voting return printing device comprising, in combination, a frame mounted upon said voting machine marginally of said bank of counter columns and arranged to be vertically shiftable relative thereto, a record sheet pack comprising a record sheet and a carbon sheet in face-to-face relation, means mounting said record sheet pack upon said frame to cover the rear surfaces of said protruding counterwheels, a printing platen disposed outside of said sheet pack and comprising a member mounting upon vertical axles a series of concave-faced rollers, said platen being mounted upon said machine so as to be shiftable from end-to-end thereof across the rear faces of said counterwheels, said rollers being dimensioned and arranged upon said platen so as to be carried thereby in horizontally traveling directions while pressing said sheet pack firmly against the protruding segment portions of said counterwheels thereby impressing upon said record sheet facsimiles of the readings of said counterwheels, and cam means carried by said machine and operable automatically upon arrival of said platen at alternate ends of said machine to cam said frame alternately up and down relative to the machine whereby to cause said record sheet pack to be positioned at different elevations during travel of said platen away from opposite ends of said machine, and means connected with said means mounting the record sheet pack upon the frame operable automatically upon arrival of said platen at one end of the machine to release said record sheet to fall by gravity out of the machine.

5. In a voting machine having a bank of counterwheels arranged in horizontally aligned rows and with peripheral segment portions thereof protruding rearwardly beyond adjacent structure of the voting machine, a voting return printing device comprising, in combination, a record sheet pack including a record sheet and a carbon sheet in face-to-face relation, means mounting said record sheet pack against the rear surfaces of said protruding counterwheels, a printing platen mounted upon said machine so as to be shiftable from end-to-end thereof across the rear faces of said counterwheels, a flexible fork carried by said platen, a vertical axle carried by said fork, and a concave-faced roller carried on said axle, said roller being dimensioned and arranged upon said platen so as to be carried thereby in horizontally traveling directions while pressing said sheet pack firmly against the protruding segment portions of said counterwheels thereby impressing upon said record sheet facsimiles of the readings of said counterwheels, and means connected with said means mounting the record sheet pack against the rear surfaces of the counterwheels operable automatically upon arrival of said platen at one end of the machine to release said record sheet to fall by gravity out of the machine.

6. In a voting machine having a bank of counter columns arranged in upright side-by-side alignment with the counterwheels thereof arranged in horizontally aligned rows and with peripheral segment portions thereof protruding rearwardly beyond adjacent structure of the voting machine, a voting return printing device comprising, in combination, a frame piece mounted upon said voting machine above said bank of counter columns and having movable pins normally extending horizontally therefrom, a record sheet pack comprising a record sheet and a carbon sheet in face-to-face relation hung upon said frame piece pins to cover the rear surfaces of said protruding counterwheels, a printing platen comprising a member mounting upon vertical axles a series of concave-faced rollers, said platen being mounted upon said machine so as to be shiftable from end-to-end thereof across the rear faces of said counterwheels, said rollers being dimensioned and arranged upon said platen so as to be carried thereby in horizontally traveling directions while pressing said record pack firmly against the protruding segment portions of said counterwheels thereby impressing upon said record sheet facsimiles of the readings of said counterwheels, and cam means operable automatically upon arrival of said platen at one end of said machine for actuating said pin means to retract relative to said frame piece for releasing said record sheet thereby permitting the latter to fall by gravity out of the machine subsequent to receiving a voting record printing thereon.

7. In a voting machine having a bank of counterwheels arranged in horizontally aligned rows and with peripheral segment portions thereof protruding rearwardly beyond adjacent structure of the voting machine, a voting return printing device comprising, in combination, a frame mounted upon said voting machine marginally of said bank of counter columns, retractable means mounting said record sheet upon said frame to cover the rear surfaces of said protruding counterwheels, a printing platen comprising a member mounting upon a vertical axle a concave-faced roller, said platen being mounted upon said machine so as to be shiftable from end-to-end thereof across the rear faces of said counterwheels, said roller being dimensioned and arranged upon said platen so as to be carried thereby in horizontally traveling directions while pressing the record sheet firmly against the protruding segment portions of said counterwheels thereby impressing upon said record sheet facsimiles of the readings of said counterwheels, and cam means operable automatically upon arrival of said platen at one end of said machine for actuating said retractable means to retract relative to said frame for releasing said record sheet, and spike means movably mounted upon said frame and operable automatically upon arrival of said platen to said end of the machine for releasing said record sheet, thereby permitting the latter to fall by gravity out of the machine subsequent to receiving a voting record printing thereon.

8. In a voting machine having a bank of counter columns arranged in upright side-by-side alignment with the counterwheels thereof arranged in horizontally aligned rows and with peripheral segment portions thereof protruding rearwardly beyond adjacent structure of the voting machine, a voting return printing device comprising, in combination, a frame mounted upon said voting machine marginally of said bank of counter columns and arranged to be vertically shiftable relative thereto, two sets of retractable pins carried by said frame, releasable grip means carried by said frame, a record sheet pack comprising a proof sheet and a carbon sheet and a record sheet and a carbon sheet in consecutive face-to-face relation mounted upon said frame to cover the rear surfaces of said protruding counterwheels, said record sheet being held by one set of said pins and said grip means, said proof sheet being held by only the other set of said pins, a printing platen comprising a member mounting upon vertical axles a series of concave-faced rollers, said platen being mounted upon said machine so as to be shiftable from end-to-end thereof across the rear faces of said counterwheels, said rollers being dimensioned and arranged upon said platen so as to be carried thereby in horizontally traveling directions while pressing said sheet pack against the protruding segment portions of said counterwheels thereby impressing upon said proof and record sheets facsimiles of the readings of said counterwheels, cam means carried by opposite ends of said machine and operable automatically upon arrival of said platen at opposite ends of said machine to cam said frame alternately down and up, and cam means operable automatically upon arrival of said platen at one end of said machine for actuating one set of said pin means to retract relative to said frame for releasing said proof sheet thereby permitting the latter to fall by gravity out of the machine subsequent to receiving a zero reading printed record thereon, and cam means operable automatically upon return of said platen to the starting end portion of the machine for actuating the other set of pins and said grip means for releasing said record sheet to fall by gravity out of the machine subsequent to receiving thereon a printed record of the total votes cast.

9. In a voting machine having a plurality of counter-columns arranged in upright side-by-side alignment with the counterwheels thereof arranged in horizontally aligned rows and protruding at peripheral segment portions thereof rearwardly beyond adjacent structure of the voting machine, a voting return record device comprising in combination a record sheet pack comprising a record sheet and a carbon sheet in face-to-face relation, means mounting said record sheet pack upon said machine to cover the rear surfaces of said protruding counterwheels, a printing platen, flexible brackets carried by said platen, concave-faced rollers carried by said brackets for rotation about vertical axes, said platen being mounted upon said machine so as to be shiftable from end-to-end thereof across the rear face of said bank of counter columns, said rollers being dimensioned and arranged upon said platen so as to be carried thereby in horizontally traveling directions while pressing said sheet pack firmly against the exposed protruding segment portions of said counterwheels, thereby impressing upon said record sheet facsimiles of the readings of said counterwheels, and means connected with said means mounting the record sheet pack upon the machine operable automatically upon arrival of said platen at one end of the machine to release said record sheet to fall by gravity out of the machine.

10. In a voting machine having a series of counterwheels in horizontal alignment, a side arm member movable automatically from a first position to a second position incidental to operation of the voting machine, a record printing sheet mounted against the horizontally aligned peripheral portions of the counterwheels, a printing platen movable from a first side of said machine to a second side thereof while pressing said record sheet against said counterwheels thereby impressing facsimiles of the readings of said counterwheels upon said record sheet, and interlock means comprising latch mechanism controlled by movement of said platen to said second side of the machine and by a manual lock and by movement of said side arm member from said first position to said second position thereof, whereby to prohibit opening of said manual lock for operation of the voting machine prior to movement of said platen from said first side of the machine to said second side thereof, and operable to prohibit return movement of said platen to the first mentioned side of said machine until said manual lock is closed, closing of said manual lock being operable automatically to close the machine against further voting operation.

11. In a voting machine having a row of counterwheels, a voting return printing device comprising, in combination, a record sheet pack including a record sheet and a printing ink transfer sheet in face-to-face relation, means mounting said record sheet pack against the rear surfaces of said counterwheels, a printing platen mounted upon said machine so as to be shiftable from end-to-end thereof across the rear faces of said counterwheels, a flexible fork carried by said platen, an axle carried by said fork, and a concave-faced roller carried on said axle, said roller being dimensioned and arranged upon said platen so as to be carried thereby while pressing said sheet pack firmly against said counterwheels thereby impressing upon said record sheet facsimiles of the readings of counterwheels, and means connected with said means mounting the record sheet pack against the rear surfaces of the counterwheels operable automatically upon arrival of said platen at one end of the machine to release said record sheet to fall by gravity out of the machine.

12. In a voting machine having a row of counterwheels, a curtain controlled member movable automatically from a first position to a second position incidental to voter operation of the voting machine, a record printing sheet mounted against the counterwheels, a printing platen movable from a first side of said machine to a second side thereof while pressing said record sheet against said counterwheels thereby impressing facsimiles of the readings of said counterwheels upon said record sheet, and interlock means comprising latch mechanism controlled by movement of said platen to said second side of the machine and by a manual lock and by movement of said curtain controlled member, whereby to prohibit opening of said manual lock for voting operation of the machine prior to movement of said platen from said first side of the machine to said second side thereof, and operable to prohibit return movement of said platen to the first mentioned side of said machine until said curtain controlled member is returned and until said manual lock is closed, closing of said manual lock operating to automatically to close the machine against further voting operation.

13. In a printing machine including a bank of counterwheels, a record sheet holding frame, a platen bar mounted upon said machine to be movable from end-to-end thereof, said machine being closed by a hinged panel, a lock device for said panel, said platen bar being normally disposed at a first position on said machine clear of said counterwheels whereby upon opening of said panel a record sheet pack may be hung upon said frame, means operable by said panel lock whereby upon closing of said panel and turning of said lock said platen bar is released, power supply means operatively connected to said platen bar for causing the latter to move under manual control from one side of said machine to the other, means carried by said platen bar for pressing the record sheet pack against said counterwheels as said platen bar moves from side-to-side to said machine, means operable automatically upon arrival of said platen bar at a second position on said machine for causing said frame to shift vertically subsequent to a first printing of "zero readings" of said counterwheels on said record sheet, lock means automatically holding said platen bar at said second position until such time as a vote is cast into said machine whereupon said platen bar is thereby released and then adapted to be returned to said first position, and cam means operable automatically upon return of said platen bar to said first position for releasing said record sheet from said frame.

14. In a printing machine including a bank of counterwheels, a record sheet holding frame, a platen bar mounted upon said machine to be movable from end-to-end thereof, said machine being closed by a hinged panel, a lock device for said panel, said platen bar being normally disposed at a first position on said machine clear of said counterwheel whereby upon opening of said panel a record sheet pack may be hung upon said frame, means operable by said panel lock whereby upon closing of said panel and turning of said lock said platen bar is released, power supply means operatively connected to said platen bar for causing the latter to move under manual control from one side of said machine to the other, means carried by said platen bar for pressing the record sheet pack against said counterwheels as said platen bar moves from side-to-side of said machine, means operable automatically upon arrival of said platen bar at a second position on said machine for causing said frame to shift vertically subsequent to a first printing of "zero readings" of said counterwheels on said record sheet, lock means automatically holding said platen bar at said second position until such time as a vote is cast into said machine whereupon said platen bar is thereby released and then adapted to be returned to said first position upon operation of said crank means.

References Cited in the file of this patent
UNITED STATES PATENTS

| | | |
|---|---|---|
| 566,459 | Lambert et al. | Aug. 25, 1896 |
| 932,307 | Myers | Aug. 24, 1909 |
| 968,070 | Newcomb | Aug. 23, 1910 |
| 2,176,371 | Wahl | Oct. 12, 1939 |